(12) United States Patent
Assmann et al.

(10) Patent No.: US 7,645,822 B2
(45) Date of Patent: Jan. 12, 2010

(54) BASIC DEACTIVATORS FOR POM PRODUCTION

(75) Inventors: Jens Assmann, Mannheim (DE); Knut Zollner, Mannheim (DE)

(73) Assignee: BASF SE, Ludwigshafen (DE)

( * ) Notice: Subject to any disclaimer, the term of this patent is extended or adjusted under 35 U.S.C. 154(b) by 207 days.

(21) Appl. No.: 11/719,042

(22) PCT Filed: Nov. 5, 2005

(86) PCT No.: PCT/EP2005/011847

§ 371 (c)(1),
(2), (4) Date: May 10, 2007

(87) PCT Pub. No.: WO2006/050869

PCT Pub. Date: May 18, 2006

(65) Prior Publication Data

US 2008/0009594 A1    Jan. 10, 2008

(30) Foreign Application Priority Data

Nov. 11, 2004   (DE) ................. 10 2004 054 629

(51) Int. Cl.
  *C08K 5/3435*   (2006.01)
(52) U.S. Cl. ............... 524/99; 524/86; 528/240; 528/241; 528/242; 528/243; 528/244; 252/183.12; 546/244
(58) Field of Classification Search ........... 252/183.12; 528/425, 240–243; 524/86, 99
  See application file for complete search history.

(56) References Cited

U.S. PATENT DOCUMENTS

| 3,254,053 | A | | 5/1966 | Fisher et al. | |
|---|---|---|---|---|---|
| 3,442,866 | A | | 5/1969 | Seddon et al. | |
| 3,904,581 | A | | 9/1975 | Murayama et al. | |
| 4,339,569 | A | | 7/1982 | Sugio et al. | |
| 4,431,794 | A | * | 2/1984 | Sadlowski et al. | 528/232 |
| 4,751,272 | A | * | 6/1988 | Okita et al. | 525/398 |
| 5,144,005 | A | | 9/1992 | Sextro et al. | |
| 5,288,840 | A | | 2/1994 | Morishita et al. | |
| 5,545,678 | A | * | 8/1996 | Giencke et al. | 523/404 |
| 5,576,823 | A | | 11/1996 | Kakuta et al. | |
| 5,726,276 | A | | 3/1998 | Nakai et al. | |
| 5,844,059 | A | * | 12/1998 | Yamamoto et al. | 528/23 |
| 6,001,905 | A | * | 12/1999 | Steinmann | 524/99 |
| 6,423,817 | B1 | * | 7/2002 | Weinerth et al. | 528/310 |
| 2003/0105199 | A1 | * | 6/2003 | Furukawa et al. | 524/386 |
| 2008/0097077 | A1 | * | 4/2008 | Assmann et al. | 528/425 |
| 2008/0167439 | A1 | * | 7/2008 | Assmann et al. | 528/230 |

FOREIGN PATENT DOCUMENTS

| DE | 1161421 | 1/1964 |
|---|---|---|
| DE | 1495228 | 2/1969 |
| DE | 1720358 | 4/1972 |
| DE | 3018898 | 11/1980 |
| DE | 3147309 | 6/1983 |
| DE | 3628561 | 3/1988 |
| DE | 4423617 | 1/1996 |
| EP | 0244245 | 11/1987 |
| EP | 0279289 | 8/1988 |
| EP | 0678535 | 10/1995 |
| EP | 0699965 | 3/1996 |
| WO | 0104171 | 1/2001 |

* cited by examiner

*Primary Examiner*—Randy Gulakowski
*Assistant Examiner*—Brieann R Fink
(74) *Attorney, Agent, or Firm*—Connolly Bove Lodge & Hutz LLP

(57) ABSTRACT

Process for preparation of polyoxymethylenes via polymerization of the monomers a) in the presence of cationic initiators b) and also, if appropriate, in the presence of regulators c), followed by deactivation and discharge from the reactor, which comprises using, as deactivator (d) at least one basic compound having at least 2 amino functions of different reactivity in one molecule.

11 Claims, No Drawings

BASIC DEACTIVATORS FOR POM PRODUCTION

This application is a National Phase of International Application No. PCT/EP2005/011847 filed on Nov. 5, 2005, which claims priority to Application No. 102004054629.0 filed in Germany on Nov. 11, 2004 under 35 U.S.C. § 119; the entire contents of all are hereby incorporated by reference.

The invention relates to an improved process for preparation of polyoxymethylenes.

It is known that oxymethylene polymers can be prepared via continuous bulk polymerization of the monomers in the presence of cationic initiators. This polymerization is often carried out in kneaders or extruders or tubular reactors. The temperature control here can be such that the oxymethylene polymer produced is either in solid form (DE-A 1 161 421, DE-A 1 495 228, DE-A 1 720 358, DE-A 3 018 898) or in melt form (DE-A 3 147 309). The work-up of polymer produced in solid form is known, see: DE-A 31 47 309, DE-A 36 28 561, EP-A 678 535, EP-A 699 965, and DE-A 44 23 617.

There are various prior-art variants of the bulk polymerization process, among which is batch polymerization in pans, continuous polymerization in kneader reactors at temperatures below the melting point, or polymerization at temperatures above the melting point of trioxane in an extruder (see WO 01/58974).

Preparation by means of suspension or precipitation polymerization with cationic initiators is generally known. In particular, the polymer produced is to be insoluble in the solvent used here, so that it is easier to isolate.

Terminators, known as deactivators, are added during both bulk and precipitation polymerization, in order to terminate the polymerization.

According to DE-A 36 17 754, DE-A 25 09 924, JP-A 59/197 415, WO 97/24384, and Res. Discl. Vol 190, p. 61 (1980), basic compounds can be used for this purpose, examples being amines and inorganic/organic bases of any type.

The deactivators known from the prior art cause problems during the work-up of the reaction mixture and any return of the same, if appropriate, into the polymerization process. Carriers or solvents are mostly added in order that the very small amounts of deactivators needed are effectively dispersed within the polymer. The effectiveness of the deactivation is decisive for the stabilization of the polymer and remains somewhat unsatisfactory with the known deactivators.

It was therefore an object of the present invention to provide an improved process for preparation of polyoxymethylene with the following advantages over the prior art:
- the cationic charges on the polymer are stabilized and further reactions in the polymer are therefore suppressed,
- these are to be capable of reacting with formate end groups and thus bind unstable end groups of the polymer,
- be capable of serving as formaldehyde scavenger and free-radical scavenger,
- and, in view of the many possible reactions, this agent should mainly be present in polymer-bonded form. There are then advantages in the work-up of the polymer because, for example, no volatile organic monomers (i.e. unconverted base) have to be removed.

Accordingly, a process has been found for preparation of polyoxymethylenes via polymerization of the monomers a) in the presence of cationic initiators b) and also, if appropriate, in the presence of regulators c), followed by deactivation and discharge from the reactor, which comprises using, as deactivator (d) at least one basic compound having at least 2 amino functions of different reactivity in one molecule.

Preferred embodiments are given in the subclaims.

In principle, the process can be carried out in any reactors with powerful mixing action, examples being pans, plowshare mixers, tubular reactors, static mixers, List reactors, kneaders, stirred reactors, extruders, and belt reactors.

The resultant POM polymers are known per se to the person skilled in the art and are described in the literature.

Very generally, these polymers have at least 50 mol % of recurring —$CH_2O$— repeat units in the main polymer chain.

The homopolymers are generally prepared by polymerizing monomers a) such as formaldehyde or trioxane, preferably in the presence of suitable catalysts.

For the purposes of the invention, recurring units are preferably polyoxymethylene co-polymers, especially those which, besides the recurring —$CH_2O$— units, also have up to 50 mol %, preferably 0.01 to 20 mol %, in particular from 0.1 to 10 mol %, and very particularly preferably from 0.5 to 3 mol %,

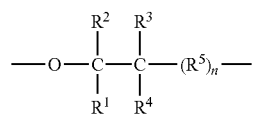

where $R^1$ to $R^4$, independently of one another, are a hydrogen atom, a $C_1$-$C_4$-alkyl group or a halogen-substituted alkyl group having from 1 to 4 carbon atoms, and $R^5$ is a —$CH_2$—, —$CH_2O$—, a $C_1$-$C_4$-alkyl- or $C_1$-$C_4$-haloalkyl-substituted methylene group or a corresponding oxymethylene group, and n is from 0 to 3. These groups may be advantageously introduced into the copolymers by ring-opening of cyclic ethers. Preferred cyclic ethers have the formula

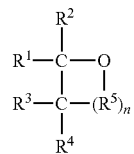

where $R^1$ to $R^5$ and n are as defined above. Mention may be made, merely as examples, of ethylene oxide, propylene 1,2-oxide, butylene 1,2-oxide, butylene 1,3-oxide, 1,3-dioxane, 1,3-dioxolane and 1,3-dioxepan as cyclic ethers, and also linear oligo- or polyformals, such as polydioxolane or polydioxepan as comonomers.

Oxymethylene terpolymers are also suitable and are prepared, for example, by reacting trioxane and one of the cyclic ethers described above with a third monomer, preferably bifunctional compounds of the formula

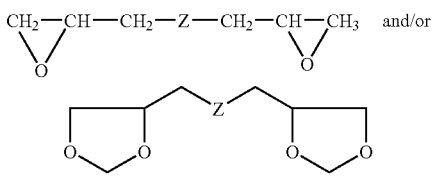

where Z is a chemical bond, —O—, —ORO— (R=$C_1$-$C_8$-alkylene or $C_3$-$C_8$-cycloalkylene).

Preferred monomers of this type are ethylene diglycide, diglycidyl ether and diethers made from glycidyl compounds and formaldehyde, dioxane or trioxane in a molar ratio of 2:1, and also diethers made from 2 mol of glycidyl compound and 1 mol of an aliphatic diol having from 2 to 8 carbon atoms, for example the diglycidyl ether of ethylene glycol, 1,4-butanediol, 1,3-butanediol, 1,3-cyclobutanediol, 1,2-propanediol and 1,4-cyclohexanediol, to mention merely a few examples.

End-group-stabilized polyoxymethylene polymers which have C—C or —O—$CH_3$-bonds at the chain ends are particularly preferred.

The preferred polyoxymethylene copolymers have melting points of at least 150° C. and molecular weights (weight-average) $M_w$ in the range from 5000 to 300 000, preferably from 7000 to 250 000.

Particular preference is given to POM copolymers with polydispersity ($M_w/M_n$) of from 2 to 15, preferably from 3 to 12, particularly preferably from 3.5 to 8. The measurements are generally made by way of (GPC) SEC (size exclusion chromatography), and the $M_n$ value (number-average molecular weight) is generally determined by means of (GPC) SEC (size exclusion chromatography).

Particularly preferred POM copolymers have bimodal molecular weight distribution, where the low-molecular-weight fraction has a molecular weight of from 500 to 20 000, preferably from 1000 to 15 000, its proportion by area in the distribution graph of w(log M) plotted against log M being from 1 to 15%, preferably from 5 to 10%.

The residual formaldehyde content to VDA 275 in the granular crude polyoxymethylene materials obtainable by the inventive process is preferably not more than 3%, with preference not more than 1%, preferably not more than 0.05%.

The average particle size ($d_{50}$ value) (grain size) of the POM polymer is preferably from 0.5 to 20 mm, with preference from 0.75 to 15 mm, and in particular from 1 to 7 mm.

The person skilled in the art generally understands the $d_{50}$ value to be that particle size value for which 50% of the particles have a smaller particle size and 50% have a larger particle size. The $d_{10}$ and $d_{90}$ values stated have corresponding meanings.

The $d_{10}$ value is preferably smaller than 1 mm, in particular 0.75 mm, and very particularly preferably smaller than 0.5 mm.

Preferred $d_{90}$ values are smaller than 30 mm, and in particular smaller than 20 mm, and very particularly preferably smaller than 10 mm.

Determination of Grain Size Distribution:

The grain size distribution was divided into different sieve fractions on the basis of a standard set of sieves (analysis sieve to DIN 4188) and these fractions were weighed. By way of example, $d_{50}$=1 mm means that 50% by weight of the specimen have a particle size smaller than or equal to 1 mm.

The inventive process is preferably used for the homo- and copolymerization of trioxane. However, in principle any monomer described above can be used as monomer a), and by way of example tetroxane or (para)formaldehyde can also be used.

The monomer feed, for example of trioxane, is preferably molten, generally at temperatures of from 60 to 120° C.

The temperature of the reaction mixture during the feed process is preferably from 62 to 114° C., in particular from 70 to 90° C.

The molecular weight of the polymer may, if appropriate, be adjusted to the desired values via the regulators c) customarily used during (trioxane) polymerization. Regulators c) which may be used are acetals or, respectively, formals of monohydric alcohols, the alcohols themselves, or else the very small amounts of water which function as chain transfer agents and whose presence can generally never be entirely avoided. The amounts used of the regulators are from 10 to 10 000 ppm, preferably from 100 to 1000 ppm.

The initiators b) used (also termed catalysts) are the customary cationic initiators used during (trioxane) polymerization. Proton acids are suitable, examples being fluorinated or chlorinated alkyl- and arylsulfonic acids, e.g. perchloric acid, trifluoromethanesulfonic acid or Lewis acids, e.g. stannic tetrachloride, arsenic pentafluoride, phosphorus pentafluoride, and boron trifluoride, and also their complexes and compounds of salt type, e.g. boron trifluoride etherates and triphenylmethylene hexafluorophosphate. The amounts used of the catalysts (initiators) are from about 0.001 to 1000 ppm, preferably from 0.01 to 100 ppm, and in particular from 0.05 to 10 ppm. It is generally advisable to add the catalyst in dilute form, preferably at concentrations of from 0.005 to 5% by weight. Solvents used for this purpose can be inert compounds, such as aliphatic, cycloaliphatic hydrocarbons, e.g. cyclohexane, halogenated aliphatic hydrocarbons, glycol ethers, etc. Triglyme is particularly preferred as solvent (triethylene glycol dimethyl ether), as is 1,4-dioxane.

Monomers a), initiators b), and, if appropriate, regulators c) may be premixed in any desired manner or else added separately from one another to the polymerization reactor. Components a), b), and/or c) may also comprise sterically hindered phenols for stabilization, as described in EP-A 129369 oder EP-A 128739.

For greater flexibility with respect to the desired $M_w$ of the POM polymer, it has proven advantageous to dissolve the regulator c) in very small amounts of solvent and then to mix and feed it with the monomers or comonomers.

In one preferred embodiment, the polymerization carried out is a precipitation polymerization (which may also be termed a suspension polymerization if it is appropriate to the degree of solubility of the individual components) in a solvent in which the resultant polyoxymethylene homo- or copolymer is very substantially insoluble. "Very substantially" insoluble is intended to mean that the polymer begins to precipitate at a degree of polymerization of at least 4.

The solvents used in particular comprise inert compounds, such as aliphatic hydrocarbons, e.g. propane, butane, pentane, isooctane, n-hexane, n-heptane, n-octane, isooctane, and also cycloaliphatic hydrocarbons, e.g. cyclohexane or cycloheptane, and also cyclopentane, and these may, if appropriate, bear heteroatoms as substituents.

Suitable aromatic hydrocarbons are those which have at least from 6 to 30 carbon atoms, preference being given to nitrobenzene, toluene, benzene.

Other suitable halogenated hydrocarbons which may be mentioned are dichloromethane, chloroform, dichloroethane, and trichloroethane.

Ethers, such as dioxane or THF, or else triglyme (triethylene glycol dimethyl ether), are also suitable inert solvents.

The solvent temperatures at the start of the reaction (feed) are preferably from 50 to 250° C., with preference from 55 to 180° C., and in particular from 60 to 130° C.

Prior to the start of the reaction it is preferable to operate under inert gas conditions, preferably under $N_2$, at pressures of from 1 to 5 bar absolute, preferably from 1 to 2 bar absolute.

The residence time for the polymerization process in the solvent (precipitation polymerization) is preferably from 0.1 to 240 min, in particular from 5 to 120 min. The polymerization is preferably conducted as far as a conversion of at least 30%, in particular more than 60%. Under favorable conditions, it is also possible here to achieve conversions of 90% and above, and quantitative conversions up to 100% give good reproducibility.

A procedure which has generally proven successful sets a pressure of from 1 to 10 bar absolute, preferably from 2 to 7 bar absolute, during the start phase of the polymerization process. The polymerization preferably takes place under an inert gas, preferably nitrogen.

In another preferred embodiment, the polymerization is carried out in water or in a melt, as described by way of example in EP-A 0 080 656 and EP-A 0 638 599.

It is preferable that the polymerization mixture is deactivated directly after the polymerization process, preferably without occurrence of any phase change.

In the case of suspension polymerization, the catalyst residues are generally deactivated via addition of at least one deactivator d):

a) via direct addition into the polymerization apparatus, preferably tank (cascade) to the precipitated POM (in particle form), or b) after complete isolation of the POM polymer from the solvent and subsequent treatment with gaseous deactivators, or c) after partial removal of the solvent and addition of the deactivator into the remaining solvent, in which the precipitated polymer is comprised, or d) after complete isolation of the polymer from the solvent and dissolution of the polymer in a suitable solvent, and addition of the deactivator to the dissolved polymer.

In the case of the preferred melt polymerization, the addition of the deactivator generally takes place a) via addition of the pure substance or of a solution or a suspension into the reaction melt, b) via addition of the substance, preferably by way of an ancillary extruder or stuffing screw into the reaction melt.

The invention uses, as deactivators (d), basic compounds having at least 2 amino functions of different reactivity in one molecule.

For the purposes of the present invention, different reactivity is different basicity of the nitrogen atoms and therefore different affinity to the cationic center on the polyacetal. Different basicity is generally attributable to a different molecular environment (see also Breitmaier/Jung, Organische Chemie [Organic chemistry], Thieme Verlag 1978, pp. 374 and 375, and Beyer/Walter, Lehrbuch der organischen Chemie [Textbook of organic chemistry], Hirzel Verlag Stuttgart 1998, p. 166).

Accordingly, use may be made of combinations of one primary and one secondary, or primary and tertiary, or secondary and tertiary, amino functions, or a mixture of these. According to the invention, these different amino functions are to be present in one molecule, the molar mass here preferably being ≦400 g/mol, in particular ≦200 g/mol.

Preferred compounds d) are those of the general formula I

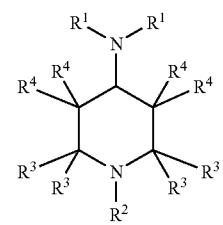

where $R^1$, $R^3$, $R^4$, and $R^5$, independently of one another, are hydrogen or a $C_1$-$C_{10}$-alkyl group, and $R^2$ is hydrogen or a $C_1$-$C_{10}$-alkyl group, or O—$R^5$.

Preferred radicals $R^1$ to $R^5$ are, independently of one another, hydrogen or a $C_1$-$C_4$-alkyl group, such as methyl, ethyl, n-propyl, isopropyl, n-butyl, isobutyl, sec-butyl, tert-butyl.

Particularly preferred deactivators d) are substituted N-containing heterocycles, in particular derivatives of piperidine, and particular preference is given here to triacetonediamine (4-amino-2,2,6,6-tetramethylpiperidine).

The amount is preferably from 0.001 to 500 ppm by weight, preferably from 0.05 to 100 ppm by weight, and in particular from 0.5 to 10 ppm by weight, based on the total weight. The ratio of d) to initiator b) is preferably from 0.1:1 to 50:1, in particular from 0.5:1 to 15:1, and very particularly from 1:1 to 10:1; based on the molar amount of the initiator.

The deactivators d) may also be mixed with other known terminators.

The resultant polymer can then be washed with inert solvents, such as acetone or cyclohexane, and, using suitable apparatus, isolated from solvent and, if appropriate, cooled.

The inventive procedure gives a compact, pulverulent granular material, avoiding any production of coarse fractions of the prior art.

Melt polymerization gives a polymer with, in particular, improved stability.

The inventive procedure gives polyoxymethylene homo- or copolymers which comprise from 0.001 to 100 ppm by weight of units which derive from at least one basic compound d) having at least 2 amino functions of different reactivity, and in particular from compounds as set out above under the general formula I. In particular, the chains have from 0.001 to 30%, preferably from 0.01 to 10%, and in particular from 0.1 to 2%, and very particularly preferably from 0.1 to 1%, of units which derive from the deactivators d).

The location of these units is preferably at the ends of the polymer chains. The appropriate polyoxymethylene polymer can then be further processed with customary additives, such as stabilizers, rubbers, fillers, etc., in the customary manner.

EXAMPLES

All Percentages Stated are Percentages by Weight Examples 1-3

A monomer mixture composed of 94% of trioxane, 6% of dioxolane, and 0.01% of butylal was fed at a volume flow rate of 1.5 l/h continuously into a polymerization reactor (tubular reactor with static mixers, T=175° C.). 1 ppm of the initiator was injected in the form of a solution (70% strength, aqueous perchloric acid, 1% strength dissolved in Triglyme) into the monomer stream, and the reaction mixture was intimately mixed in a coiled-tube reactor with static mixers. Downstream of a polymerization section of 4 m, an aqueous solution of the deactivator d) (see table) was injected at 1% strength into the polymer melt, the resultant molar excess of the terminator over the initiator being twenty-fold. After a residence time of about 3 min, the polymer melt was discharged.

The thermal stability of the polymer was then determined by TGA (thermogravimetric analysis), heating the specimen at 5° C./min and recording the weight loss from the specimen (RT to 450° C.).

Mn/Mw was determined by means of GPC, standard: Ultraform® N 2320

| Ex | Terminator | Mn, Mw | Temperature [° C.] for weight loss of | | |
| | | | 30% | 50% | 70% |
|---|---|---|---|---|---|
| 1 | Triacetonediamine, 1% strength in water | 10 200, 40 700 | 295.37 | 346.72 | 368.27 |
| 2 C | Triethylamine, 1% strength in water | 13 500, 47 400 | 271.82 | 313.89 | 347.54 |
| 3 C | Triethyl phosphite, 1% strength in water | 12 500, 46 700 | 286.37 | 319.54 | 356.46 |

C = for comparison

The invention claimed is:

1. A process for preparing polyoxymethylene comprising polymerizing a monomer (a) in the presence of a cationic initiator (b) and optionally, in the presence of a regulator (c), in a reactor followed by deactivation and discharge of the polyoxymethylene from the reactor, wherein the deactivation utilizes as deactivator (d), at least one basic compound of the general formula I:

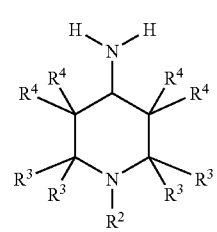

where $R^2$, $R^3$ and $R^4$, independently of one another, are hydrogen or a methyl group.

2. The process according to claim 1, wherein deactivator (d) is 4-amino-2,2,6,6-tetramethylpiperidine.

3. The process according to claim 1, wherein from 0.001 to 1000 ppm by weight of initiator (b) is utilized.

4. The process according to claim 1, wherein from 0.001 to 500 ppm by weight of deactivator (d) is utilized.

5. The process according to claim 1, wherein the molar ratio of deactivator (d) to initiator (b) is from 200:1 to 0.1:1.

6. The process according to claim 2, wherein from 0.001 to 1000 ppm by weight of initiator (b) is utilized.

7. The process according to claim 2, from 0.001 to 500 ppm by weight of deactivator (d) is utilized.

8. The process according to claim 3, from 0.001 to 500 ppm by weight of deactivator (d) is utilized.

9. The process according to claim 2, wherein the molar ratio of deactivator (d) to initiator (b) is from 200:1 to 0.1:1.

10. The process according to claim 3, wherein the molar ratio of deactivator (d) to initiator (b) is from 200:1 to 0.1:1.

11. The process according to claim 4, wherein the molar ratio of deactivator (d) to initiator (b) is from 200:1 to 0.1:1.

* * * * *